United States Patent
Sun et al.

(10) Patent No.: US 11,359,485 B2
(45) Date of Patent: Jun. 14, 2022

(54) FULL DIGITAL DEVICE OF RECEIVING TRANSDUCER ARRAY OF ACOUSTIC LOGGING WHILE DRILLING INSTRUMENT

(71) Applicant: Institute of Geology and Geophysics, Chinese Academy of Sciences, Beijing (CN)

(72) Inventors: Yuntao Sun, Beijing (CN); Wenxuan Chen, Beijing (CN); Qingyun Di, Beijing (CN); Jian Zheng, Beijing (CN); Wenxiu Zhang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 17/222,993

(22) Filed: Apr. 5, 2021

(65) Prior Publication Data

US 2021/0355821 A1 Nov. 18, 2021

(30) Foreign Application Priority Data

May 14, 2020 (CN) .......................... 202010408509.5

(51) Int. Cl.
*E21B 47/14* (2006.01)
*G01V 1/52* (2006.01)

(52) U.S. Cl.
CPC .................................. *E21B 47/14* (2013.01)

(58) Field of Classification Search
None
See application file for complete search history.

(56) References Cited

U.S. PATENT DOCUMENTS

| 2005/0150713 A1* | 7/2005 | Garcia-Osuna | ......... E21B 47/01 |
| | | | 181/108 |
| 2009/0183941 A1* | 7/2009 | Pabon | .................... G01V 1/523 |
| | | | 181/102 |

FOREIGN PATENT DOCUMENTS

| CN | 101691841 A | | 4/2010 | |
| CN | 103256044 | * | 8/2013 | ............. E21B 47/14 |
| CN | 103256044 A | | 8/2013 | |
| CN | 108643893 A | | 10/2018 | |
| WO | 2018063143 A1 | | 4/2018 | |

OTHER PUBLICATIONS

Patent Translate CN 103256044 A.*
Zhang, Jikai; Silicone materials; China Material Press; ISBN 7-5047-1260-4, Oct. 31, 1999, pp. 441.

\* cited by examiner

*Primary Examiner* — Curtis A Kuntz
*Assistant Examiner* — Jerold B Murphy
(74) *Attorney, Agent, or Firm* — Novick, Kim & Lee, PLLC; Allen Xue

(57) ABSTRACT

An acoustic while drilling receiving transducer array adopts a full-digital structure and a non-oil-filled rubber encapsulation arrangement mode, and the full-digital device of the acoustic while drilling receiving transducer array includes first modules, configured to carry out acoustic-to-electric conversion on weakly received acoustic signals of strata; second modules, configured to carry out amplification, filtering, gain control and digital-to-analog conversion on the weakly received acoustic signals; and a third module, configured to control interfaces of the device and convert external input and output signals.

10 Claims, 7 Drawing Sheets

FULL DIGITAL DEVICE OF RECEIVING TRANSDUCER ARRAY OF ACOUSTIC LOGGING WHILE DRILLING INSTRUMENT

FIELD

The present invention belongs to the technical field of acoustic logging while drilling, and in particular relates to a full-digital device of a receiving transducer array of an acoustic logging while drilling instrument.

BACKGROUND

Acoustic logging while drilling as one of three technologies (resistivity, radioactivity and acoustic wave) of logging while drilling has an important position in oil drilling and logging, and can realize monitoring of stratum porosity and pressure early-warning in a drilling process and thus can improve drilling efficiency and reduce drilling operation risk.

The principle of acoustic logging while drilling is the same as that of wireline logging: 1, an acoustic wave velocity per hour in a stratum is acquired through different propagation velocities of acoustic waves in the strata, so that the current drilled stratum is reflected; and 2, conversion from electricity to sound and from sound to electricity is realized through acoustic transmitting and receiving transducers. Different aspects of the two principles are as follows: the acoustic logging while drilling is to measure acoustic velocity information of the drilled stratum in real time while drilling; however, the wireline logging is to realize acoustic velocity measurement of the stratum in a wireline suspension mode after drilling operation is completed.

As shown in FIG. 1, when an instrument works in a well, an acoustic emission system excites an acoustic emission source through high-voltage excitation pulses to generate acoustic signals, and after being emitted into the stratum and then transmitted through the stratum, the acoustic signals reach a receiver array, and conversion from the received acoustic signals to electric signals is achieved through a receiver array which is arranged at a fixed distance from the acoustic emission source.

The transmitting transducers and receiving transducers are passive devices mainly composed of piezoelectric ceramics. The acoustic signals received by the receiving transducers are converted into weak current signals through piezoelectric ceramic wafers, and amplitudes of the weak current signals are greatly different along with the different drilled strata. The amplitudes are at the level of hundreds of uv to hundreds of mv, so that the signals need to be subjected to automatic gain control operation and filtering amplification operation.

At present, in a development process of logging instruments, digital sampling of the signals is generally achieved through a pre-amplification circuit and an acquisition circuit (an automatic gain control (AGC) circuit and an analog-to-digital converter (ADC)). The pre-amplification circuit should be close to the receiving piezoelectric ceramic wafer as much as possible and amplifies and filters the weak signals, and subsequent automatic gain control and analog-to-digital conversion (ADC) functions are placed in a circuit part of an acoustic receiving system. As shown in FIG. 1, the receiving transducer adopts the mode of packaging the single piezoelectric ceramic wafer. The pre-amplification circuit and the subsequent acquisition circuit are placed outside the receiving piezoelectric ceramic wafer, the pre-amplification circuit is very close to the receiving ceramic wafer, but the acquisition circuit needs to be placed in an inner cavity of the instrument, and the distance is long (generally 30-50 cm). The arrangement mode has the following characteristics: 1, the ceramic wafer arrangement structure is simple, 2, a signal-to-noise ratio of the received weak signal is improved to a certain extent after pre-amplification, but the signal is still an analog signal, so that after being transmitted to the acquisition circuit (30 cm-50 cm), the signal is extremely easy to influence by external environment, noise is increased, and thus the signal-to-noise ratio of the signal is reduced.

In order to improve the signal-to-noise ratio of the received weak signal, the most direct method is to carry out digitalization nearby, and then transmit an acquired waveform to the acoustic receiving system through a digital signal for subsequent data processing.

The prior art in China: analog signals are used for transmission, and no signal digitalization is performed nearby, so that noise immunity is relatively poor. With reference to US patent US20050150713A1 which adopts a full-digital mode, all modules are placed in an oil-filled environment, so that nearby digitalized sampling is realized, and the signal-to-noise ratios of the signals are improved. But, an installation process of an oil filling mode and digitalization of the modules adopted by the above-mentioned US patent are complex and cannot be realized in China.

SUMMARY

In order to achieve the purpose, the present invention relates to a digital packaging technology of a receiving transducer and a reasonable layout and signal extraction technology for digitalization. The present invention provides a full-digital device of an acoustic while drilling receiving transducer array, so as to achieve preprocessing and acquisition of received acoustic signals in a while-drilling process. The device is simple in structure, easy to implement, suitable for severe environments such as strong vibration and impact and high temperature in the while-drilling process, and convenient to apply and popularize in the market.

According to one aspect of the present invention, a full-digital device of an acoustic while drilling receiving transducer array is provided; after being subjected to digitalization, the acoustic while drilling receiving transducer array adopts a full-digital structure and adopts a non-oil-filled rubber encapsulation arrangement mode; and the full-digital device of the acoustic while drilling receiving transducer array includes:

first modules, configured to carry out acoustic-to-electric conversion on weakly received acoustic signals of strata;

second modules, configured to carry out amplification, filtering, gain control and digital-to-analog conversion on the weakly received acoustic signals; and a third module, configured to control interfaces of the device and convert external input and output signals.

Furthermore, the full-digital device of the acoustic while drilling receiving transducer array includes an even number of first modules, and each first module is independently packaged.

Furthermore, the first modules are receiving type piezoelectric ceramic wafers.

Furthermore, the receiving type piezoelectric ceramic wafers have the length of 40 mm and the width of 25.4 mm.

Furthermore, the receiving type piezoelectric ceramic wafers are placed at the interval of 152.4 mm after being encapsulated with rubber.

Furthermore, the second modules are internal packaged circuits.

Furthermore, the internal packaged circuit includes:

a pre-amplification circuit, configured to carry out amplification on the weakly received acoustic signals;

a band-pass filtering circuit, configured to achieve band-pass filtering;

an automatic gain control circuit, configured to achieve automatic gain control on the weakly received acoustic signals; and an analog-to-digital conversion circuit, configured to achieve analog-to-digital conversion operation of digitalization on the weakly received acoustic signals.

Furthermore, the third module is an interface multiplexer (MUX) circuit.

Furthermore, the interface MUX circuit adopts serial peripheral interface (SPI) serial communication interfaces for achieving external output and input.

Furthermore, the interface MUX circuit is integrated with automatic gain control (AGC) logic, and is configured to carry out gain control adjustment operation on the second modules.

Furthermore, the full-digital device of the acoustic while drilling receiving transducer array carries out communication in a differential mode.

The present invention has the following beneficial effects:

Through a full-digital structure, low-noise signal acquisition of the acoustic while drilling receiving transducer array is realized, and a non-oil-filled rubber encapsulation mode is adopted, so that installation, debugging and maintenance operations of the instrument are simplified. The signal-to-noise ratios and consistency of the received signals are improved.

BRIEF DESCRIPTION OF THE DRAWINGS

In order to more clearly describe technical solutions in embodiments of the present invention or the prior art, accompanying drawings required for describing the embodiments or the prior art will be briefly introduced hereinafter. Obviously, the accompanying drawings in the following description are merely some embodiments of the present invention, and for those skilled in the art, other accompanying drawings may be obtained based on structures shown in these accompanying drawings without paying creative labor.

The achievement of objectives, functional characteristics and advantages of the present invention will be further explained with reference to the accompanying drawings in conjunction with the embodiments.

DETAILED DESCRIPTION OF THE EMBODIMENTS

Exemplary embodiments will be described in detail herein and examples of exemplary embodiments are illustrated in accompanying drawings. When the following description refers to the drawings, same numerals in the different accompanying drawings represent the same or similar elements unless otherwise indicated. The embodiments described in the following exemplary embodiments do not represent all embodiments consistent with the present disclosure. Contrarily, they are merely examples of devices and methods consistent with some aspects of the present disclosure, as detailed in the appended claims.

Terms "first", "second" and the like in the description and claims of the present disclosure are used for distinguishing similar objects and not for describing a specific order or sequence. It should be understood that data thus used is interchangeable under appropriate circumstances, so that the embodiments of the present disclosure described herein can be implemented in sequences other than those illustrated or described herein. Moreover, the terms "comprising" and "including," as well as any modifications thereof, are intended to cover non-exclusive inclusion, for example, a process, method, system, product, or apparatus including a series of steps or units are not necessarily limited to those steps or units expressly listed, but may comprise other steps or units not expressly listed or inherent to such process, method, product, or apparatus.

"A plurality of" includes two or more.

It should be understood that "and/or", as for the term "and/or" as used in this disclosure, merely describes an association of associated objects, and means that there may be three relationships. For example, A and/or B can mean three relationships: A is present alone, A and B are present simultaneously, and B is present alone.

The present invention provides a full-digital device of an acoustic while drilling receiving transducer array, so as to achieve preprocessing and acquisition of received acoustic signals in a while-drilling process. The device adopts a full-digital structure, nearby sampling of received signals and an arrangement structure of the whole device. Compared with the prior art, the device is simple in structure and easy to implement. Meanwhile, a non-oil-filled rubber encapsulation arrangement mode is adopted and is different from the prior art.

Figure 1:
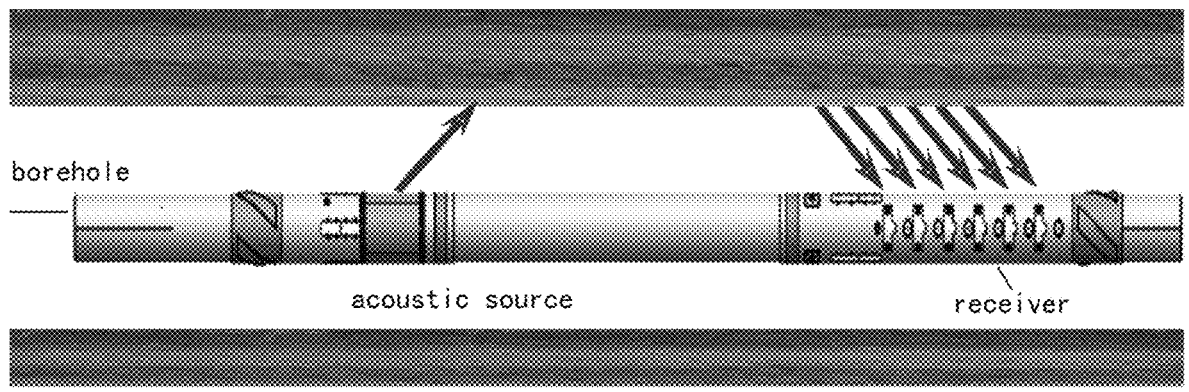
FIG. 1 shows a working state diagram of an acoustic logging while drilling instrument.
Figure 2:
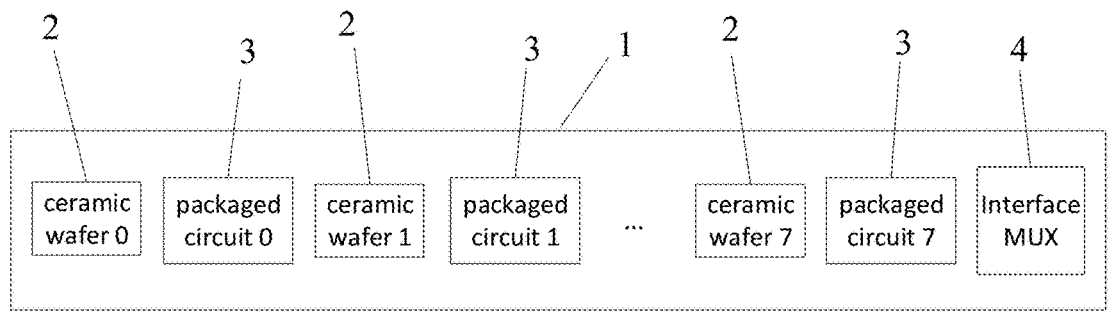
FIG. 2 shows a structural diagram of a full-digital device of a receiving transducer array of an acoustic logging while drilling instrument according to an embodiment of the present invention.

The whole device 1 is composed of three different types of sub-modules, including sub-modules 2 (piezoelectric ceramic wafers 0-7, 8 in total), sub-modules 3 (packaged circuits 0-7, 8 in total) and a sub-module 4 (interface MUX, 1). The structure is shown in FIG. 2.

The overall length of the device is 1300 mm, the sub-modules 2 are placed at the interval of 152.4 mm, and the packaged circuit is placed between the two sub-modules 2.

The device includes the eight receiving ceramic wafers. Each receiving ceramic wafer is independently packaged; and the receiving ceramic wafers are placed at the interval of 152.4 mm after being encapsulated with rubber. The ceramic wafer is a piezoelectric ceramic wafer with the length of 40 mm and the width of 25.4 mm, and the ceramic wafer is generally adopted by development of wireline logging and logging while drilling instruments.

Sub-module 2: receiving type piezoelectric ceramic wafer: acoustic-to-electric conversion is carried out on acoustic signals of strata.

Sub-module 3: internal packaged circuit: amplification, filtering, gain control and analog-to-digital conversion on weakly received signals are achieved, and the internal packaged circuit includes: a pre-amplification circuit 5 configured to amplify and filter weak current signals; a filter 6 configured to achieve band-pass filtering; an automatic gain control (AGC) circuit 7 configured to achieve automatic gain control on weak signals; and an analog-to-digital conversion (ADC) circuit 8 configured to achieve analog-to-digital conversion operation of digitalization on the signals.

Sub-module 4: interface MUX circuit: control on interfaces of the whole device and conversion of external input and output signals of the whole device are achieved. SPI serial communication interfaces are adopted for achieving external output and input. In order to improve transmission efficiency and reliability, the device carried out communication in a differential mode. Automatic gain control (AGC) logic is also integrated in the sub-module 4, an external control circuit of the device can carry out gain control and adjustment operation on each sub-module 3 through an SPI interface.

Figure 3:
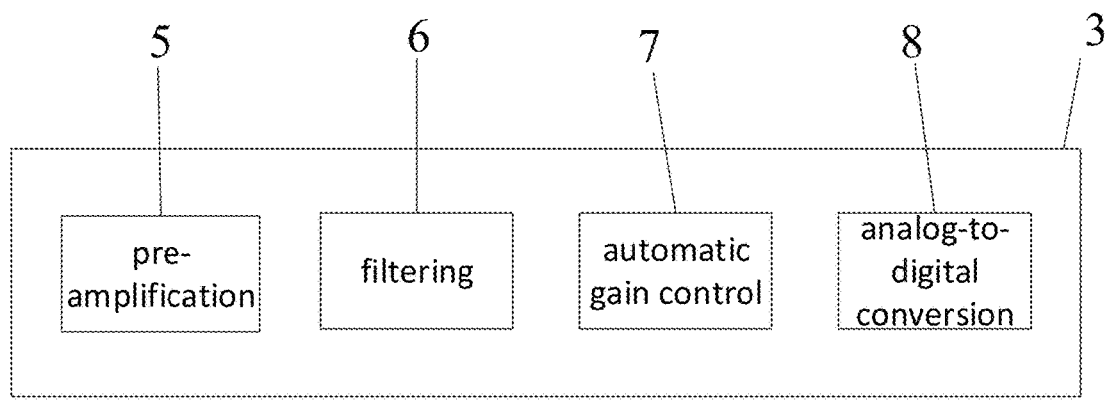
FIG. 3 shows a structural diagram of a second module of a full digital method and device of a receiving transducer array of an acoustic logging while drilling instrument according to an embodiment of the present invention.

Hereinafter, 5, 6, 7, 8 of the internal packaged circuit of the sub-module 3 are described in detail in connection with FIG. 3.

Sub-module 5: pre-amplification circuit: weak signals of the ceramic wafers are received, and are amplified and filtered. Specific functions of the sub-module 5 are shown in the following figure. Two-time amplification and two-order low-pass filtering of differential signals are achieved, and the 3 dB attenuation point of filtering is 30 kHz.

Sub-module 6: band-pass filtering is carried out, and the filtering band (3 dB point) is 200 Hz to 30 kHz.

Sub-module 7: AGC is carried out, and 4 times to 128 times of adjustable gain control can be achieved.

Sub-module 8: ADC: analog to digital conversion of the signals can be achieved, wherein the sampling rate is 10 kHz, the sampling bit width is 16 bit, and the dynamic sampling range is 0-3.3 v.

According to the whole device, the sub-modules 3 are firstly encapsulated with rubber, and after rubber encapsulation is finished, the sub-modules 3 and the sub-modules 2 are integrally encapsulated with rubber.

Figure 4:
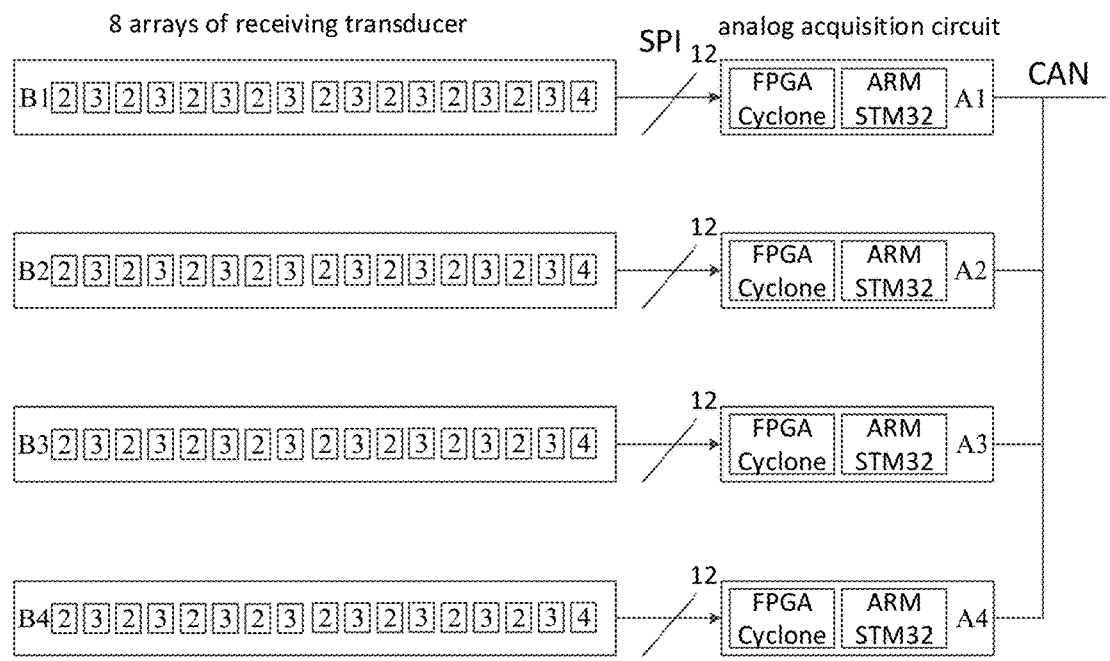
FIG. 4 shows a structural diagram of a 4-band receiving transducer array device implemented according to an embodiment of the present invention.

The use example is as follows: after the device is integrally packaged, as shown in FIG. 4, the 4-band (B1 to B4) receiving transducer array device is realized. After being connected with 12 signal lines from external, the analog acquisition circuit can read the received signals of the receiving transducer array in real time through the SPI interfaces, and after processing through digital filtering, the signals were sent to outside through CAN bus by using FPGA of Cyclone series and ARM of STM32 series, wherein the sampling rate reaches 100 kHz. Meanwhile, after digital packaging of the 8 receiving type ceramic wafers is realized, power consumption of the device is controlled within 1 W at normal temperature, and is controlled within 1.6 W at the temperature of 175° C. Meanwhile, the device can bear the external annular pressure of 172 Mpa after being encapsulated with rubber. The device can be simply applied to development of the logging while drilling and wireline logging instruments.

According to the device provided by the present invention, digital operation of the received acoustic signals can be realized. The sampling rate is 100 kHz, and the bit width is 16 bit. The adjustable dynamic gain range is 4 to 128 times. The dynamic range of the sampling voltage is 0-3.3 v.

The technical effect verification process is as follows:

(1) The signal-to-noise ratios of the signals are improved after the receiving transducer array is digitized, for receiving the weak signals, various processing including analog signal processing such as acquisition, matching, filtering, amplification and re-filtering of the weak signals is carried out on the interface MUX circuit module and the packaged circuit module, and then analog-to-digital conversion is realized through the ADC.

Figure 5:
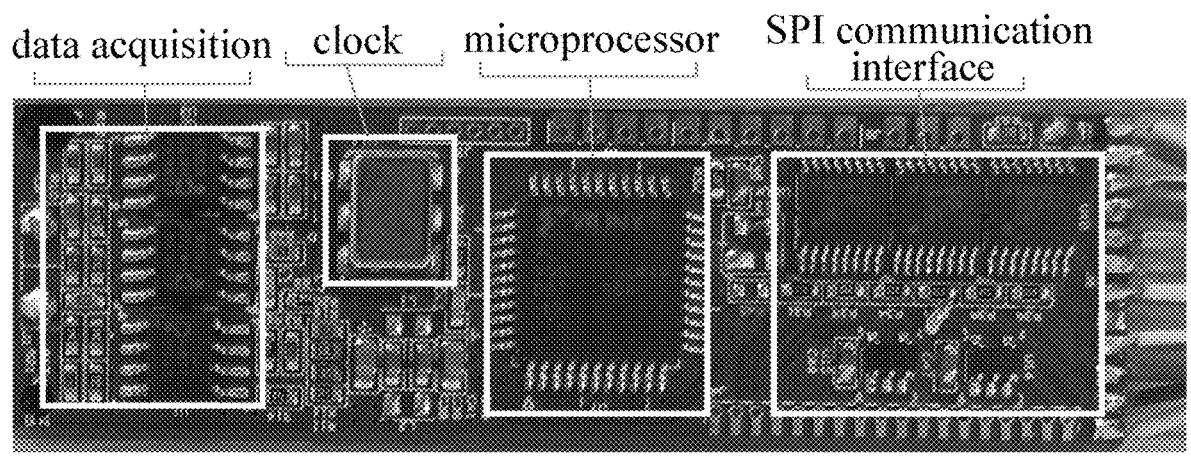
FIG. 5 shows an interface MUX circuit module according to an embodiment of the present invention.
Figure 6:
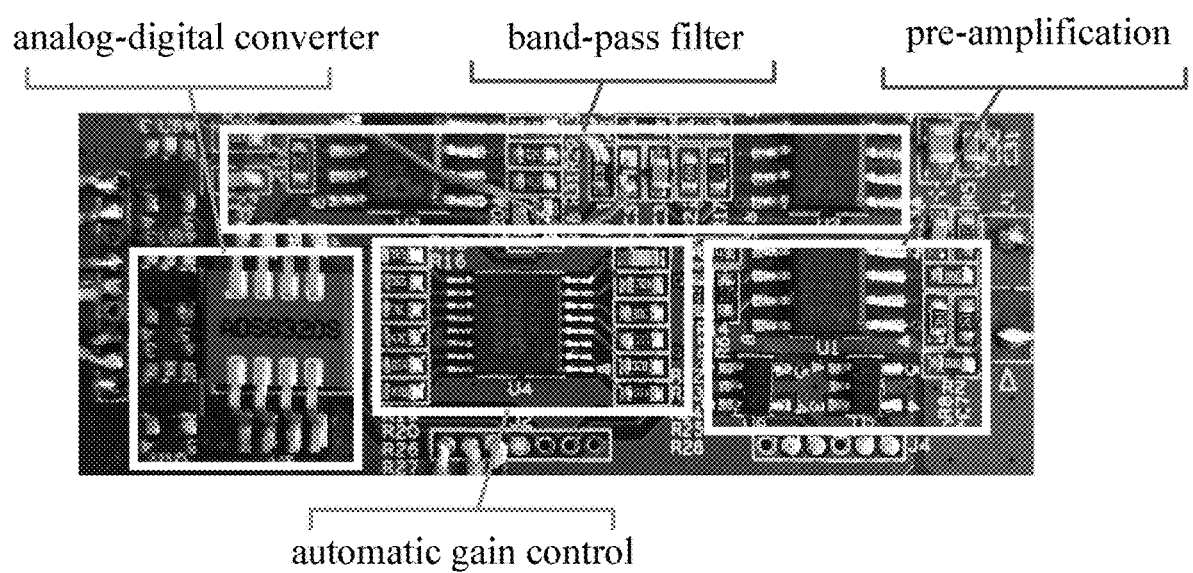
FIG. 6 shows a packaged circuit module according to an embodiment of the present invention.
Figure 7:
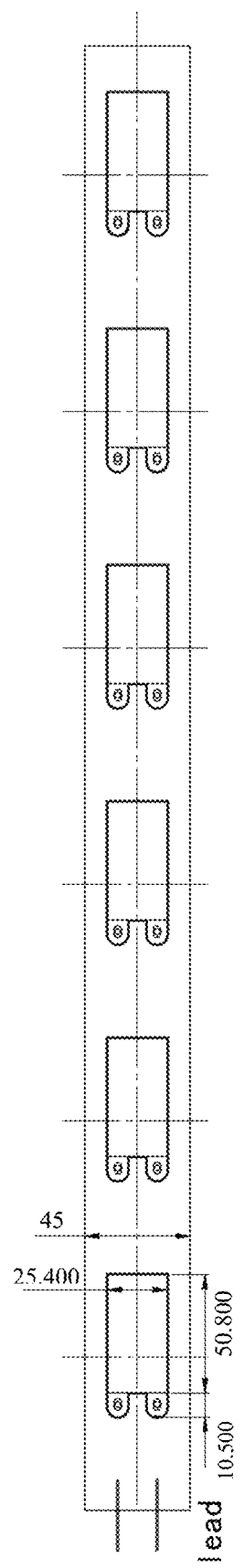
FIG. 7 shows a schematic diagram of an arrangement structure according to an embodiment of the present invention.
Figure 8:
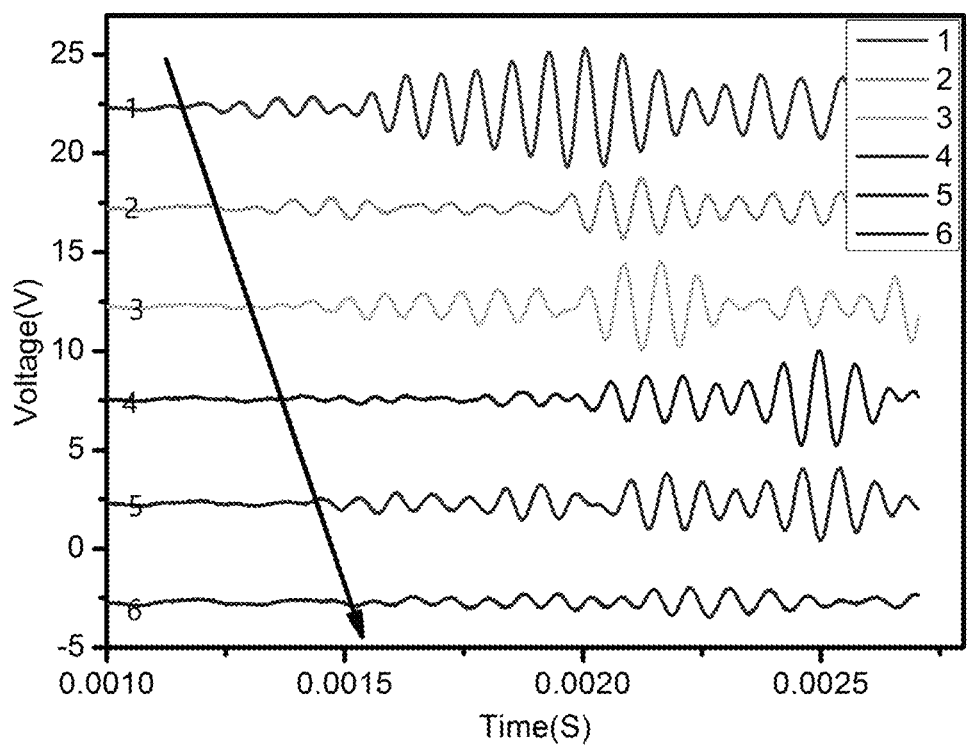
FIG. 8 shows a schematic diagram of received weak signals acquired after digitization according to an embodiment of the present invention.

According to the arrangement structure and method of FIG. 7, six groups of ceramic wafers, the interface MUX circuit module (as shown in FIG. 5) and the packaged circuit module (as shown in FIG. 6) are subjected to overall electric fitting and testing (electric fitting is carried out according to the layout method, but encapsulation is not carried out), full digitalization of the six receiving type ceramic wafers is realized, and the received weak signals acquired after digitalization are as shown in FIG. 8. The consistency, signal-to-noise ratios and the anti-interference capability of the signals are improved.

(2) The quality of the signals acquired after the full-digital receiving transducer array (2 ceramic wafers) is encapsulated is further improved.

Figure 9:
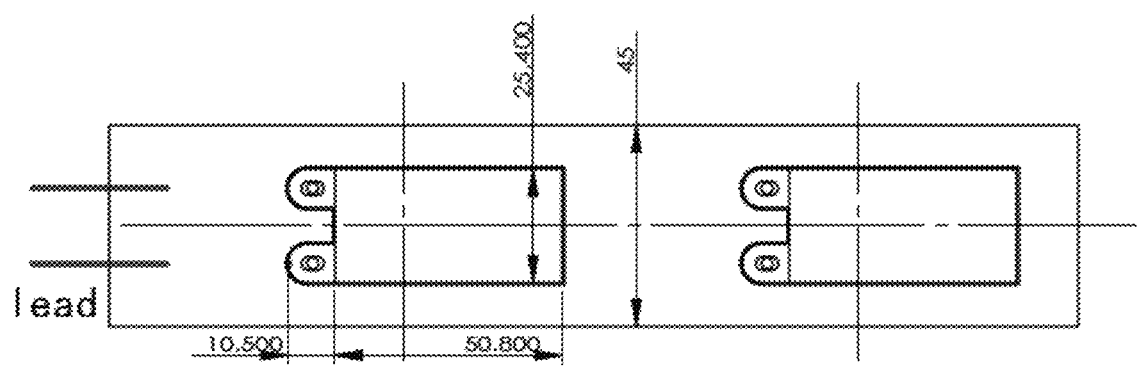
FIG. 9 shows a schematic diagram of structural layout dimensions of a receiving transducer array before encapsulation according to an embodiment of the present invention.
Figure 10:
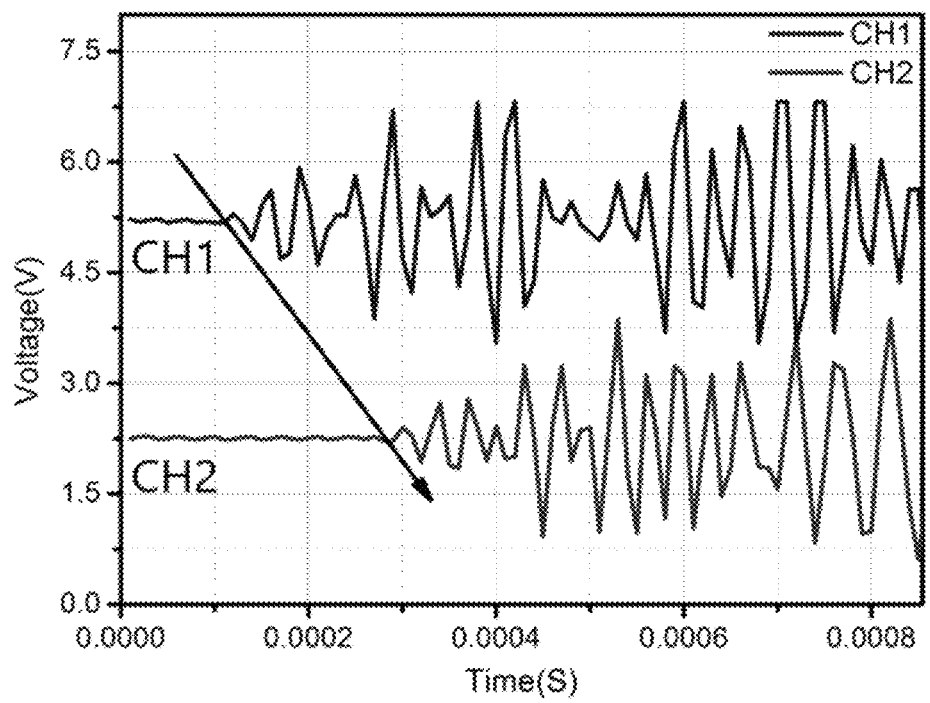
FIG. 10 shows a schematic diagram of signals received at a 3 Khz excitation source according to an embodiment of the present invention.
Figure 11:
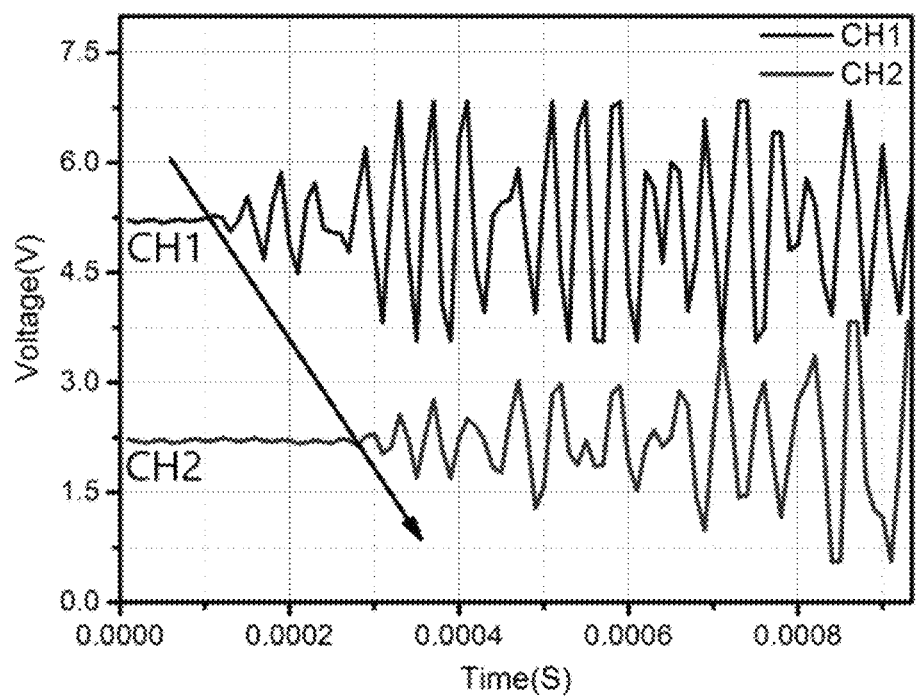
FIG. 11 shows a schematic diagram of signals received at a 12 Khz excitation source according to an embodiment of the present invention.

The diagram of structural layout dimensions of the receiving transducer array before encapsulation is shown in FIG. 9. According to the layout dimension, non-oil-filled encapsulation of the full-digitalization receiving transducers in two arrays is achieved, and then the two full-digitalization receiving transducer arrays are placed in silicone oil for testing acoustic system performance, and the quality of the received signals is improved under the excitation sources of 3 Khz (shown in FIG. 10) and 12 KHz (shown in FIG. 11).

The performance of the bands after whole encapsulation is as follows:

power consumption at the normal temperature: 1.14 W
power consumption at the temperature of 180° C.: less than 1.5 W
noise: 50 mv@20 kHz
sampling rate: 100 kHz
sampling accuracy: 16 bit
sampling voltage: 0 v to 3.3 v
gain: adjustable from 4 to 128 times
withstand pressure: 125 Mpa (actually measured confining pressure)

Figure 12:
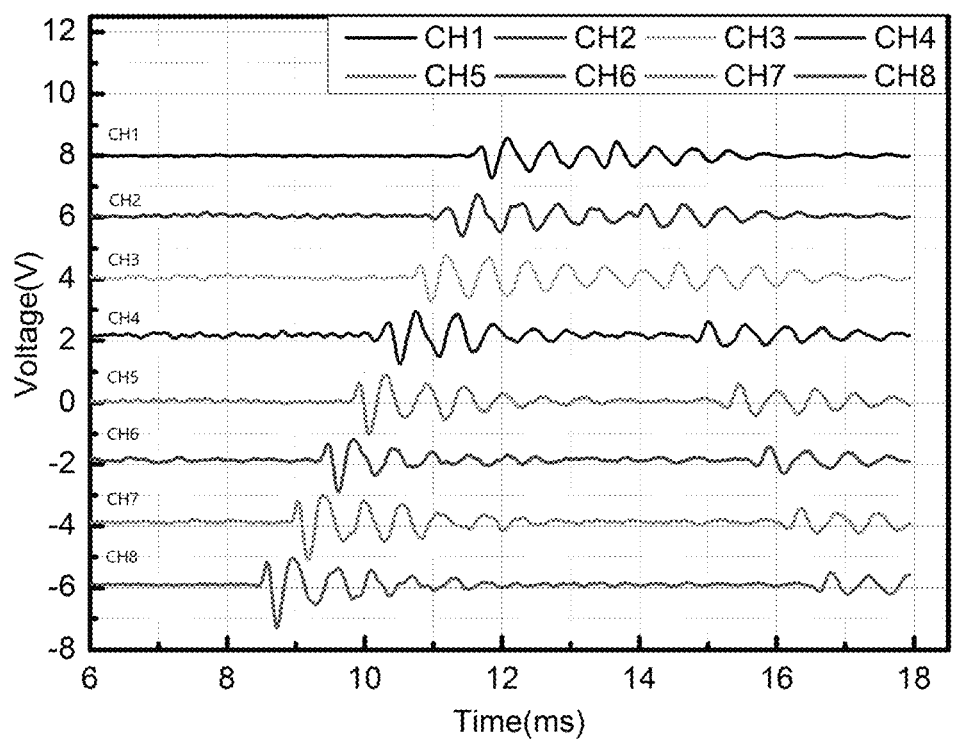
FIG. 12 shows a schematic diagram of signals acquired by a full-digital array of 8 receiving transducers (8 ceramic wafers) after encapsulation according to an embodiment of the present invention.

(3) The signals acquired after the full-digital array of 8 receiving transducers (8 ceramic wafers) is encapsulated are shown in FIG. 12.

The performance of the receiving bands after encapsulation is as follows:

time difference: 330 m/s excitation frequency: 5 kHz, single cycle, sine
actual amplitude of the receiving signals (consistent with a hydrophone): 110 uv
amplitudes CH1-CH8 are gradually reduced
sampling rate: 100 kHz
sampling accuracy: 16 bit
minimal resolution: 50 nv (effective sampling 10 bit)
dynamic sampling range: 0 v to 3.3 v
gain: 65,000 times, 64-order adjustable
power consumption at the normal temperature: 1.14 W
power consumption at the temperature of 180° C.: less than 1.5 W
dimensions: 1300*50*15 mm
interface: SPI*2, 10 Mbps
power supply: ±3.3 v Embodiments of the present invention are described above in connection with the accompanying drawings, but the present invention is not limited to the specific embodiments described above, which are merely illustrative and not limiting; and many forms may be made by those skilled in the art without departing from the spirit of the present invention and the scope of the claims under inspiration of the present invention, and these are all within the scope of the present invention.

The invention claimed is:

1. A full-digital device of an acoustic while drilling receiving transducer array, comprising:
   a plurality of first modules, configured to carry out acoustic-to-electric conversion on acoustic signals received from strata;
   a plurality of second modules, each configured to carry out amplification, filtering, gain control, and digital-to-analog conversion on signals received from one of the plurality of first modules; and
   a third module that controls interfaces of the device and convert external input and output signals of the device,
   wherein each second module comprises a pre-amplification circuit configured to perform two-time amplification and two-order low pass filtering of differential signals from one of the plurality of the first modules with a 3 dB attenuation point of filtering at 30 kHz, a band-pass filtering circuit configured to carrying out filtering of signals from the pre-amplification circuit with a filtering band having a 3 dB attenuation point of filtering of 200 Hz to 30 kHz, an automatic gain control circuit configured to implement 4 times to 128 times of adjustable gain control of signals from the band-pass filtering circuit, and an analog-to-digital conversion circuit configured to coverts signals from the automatic gain control circuit to digital signals with a sampling rate of 10 kHz, a sampling bit width of 16 bit, and a dynamic sampling range of 0-3.3 V.

2. The full-digital device of the acoustic while drilling receiving transducer array according to claim 1, comprising an even number of first modules, and each first module is independently packaged.

3. The full-digital device of the acoustic while drilling receiving transducer array according to claim 1, wherein each first module is a receiving type piezoelectric ceramic wafer.

4. The full-digital device of the acoustic while drilling receiving transducer array according to claim 3, wherein the receiving type piezoelectric ceramic wafer has a length of 40 mm and a width of 25.4 mm.

5. The full-digital device of the acoustic while drilling receiving transducer array according to claim 1, wherein each second module is an internal packaged circuit.

6. The full-digital device of the acoustic while drilling receiving transducer array according to claim 1, comprising a rubber encapsulation layer covering the plurality of second modules and the plurality of first modules, wherein each of the plurality of second modules is individually encapsulated with rubber.

7. The full-digital device of the acoustic while drilling receiving transducer array according to claim 1, wherein the third module is an interface MUX circuit.

8. The full-digital device of the acoustic while drilling receiving transducer array according to claim 7, wherein the interface MUX circuit adopts SPI serial communication interfaces for achieving external output and input.

9. The full-digital device of the acoustic while drilling receiving transducer array according to claim 7, wherein the interface MUX circuit is integrated with AGC logic, and is configured to carry out gain control adjustment operation on the plurality of second modules.

10. The full-digital device of the acoustic while drilling receiving transducer array according to claim 1, wherein the full-digital device of the acoustic while drilling receiving transducer array carries out communication in a differential mode.

* * * * *